UNITED STATES PATENT OFFICE 2,182,306

POLYMERIZATION OF ETHYLENE IMINES

Heinrich Ulrich, Ludwigshafen-on-the-Rhine, and Walter Harz, Dormagen, Germany, assignors to I. G. Farbenindustrie Aktiengesellschaft, Frankfort-on-the-Main, Germany No Drawing. Application April 24, 1936, Serial No. 76,260. In Germany May 10, 1935

8 Claims. (Cl. 260—2)

The present invention relates to new valuable nitrogenous products and a process of producing same.

We have found that nitrogenous products which are very valuable industrially can be obtained by polymerizing ethylene-imines in the presence of agents promoting polymerization. The polymerization may be brought about by allowing the mass to stand for long periods or by heating in the presence of catalysts. Most suitable catalysts are acids and other reacting substances etc. which are preferably employed in small amounts. A satisfactory effect is obtained by working with an addition of small amounts of inorganic acid salts, as for example sodium bisulphate, or inorganic or organic acids, as for example hydrochloric acid, or surface-active substances, especially those containing still low amounts of acid reacting substances from their preparation, such as bleaching earths or active carbon or silica gel. In many cases it is convenient to add agents splitting off acids during the reaction as for example chloramines or boron fluoride. Oxidizing agents such as peroxides, for example hydrogen peroxide also promote polymerization. Solvents or diluents may be employed. Colorless viscous to waxy products are obtained depending on the reaction conditions employed. The products of a low degree of polymerization are soluble in water. In addition to ordinary ethylene-imine, its homologues and the substitution products of ethylene-imines may also be employed as initial materials according to this invention. The reaction may be carried out at temperatures up to about 200°, preferably it is effected between 50° and 120° C.

The polymerization products of ethylene-imines obtained according to the process described are not piperazine and may be employed for a great variety of purposes. For example they are suitable as levelling agents, impregnating agents, for the improvement of artificial silk, in particular the animalization of artificial silk, as additions in the rubber industry and also in the preparation of mixed polymerization products from acrylic acid and its derivatives. The polymerization may also be carried out in the presence for example of amines of high molecular weight, reaction products of ethylene oxide on organic compounds, or ethylene oxide.

The products obtainable according to this invention may be employed together with other substances, as for example Turkey red oils, sulphonic acids of aromatic or aliphatic compounds, polymerization products of ethylene oxide or reaction products of ethylene oxide on organic compounds having hydroxy, carboxylic or amino groups. They may also be employed with advantage in many cases together with organic solvents, such as cyclohexanol, cyclohexanone, carbon tetrachloride, benzine, glycol ethers, alkylolamines or inorganic salts, as for example sodium phosphates or sodium perborate.

The following examples will further illustrate the nature of this invention but the invention is not restricted to these examples.

Example 1

A 10 per cent solution of ethylene-imine containing a small amount of chlorethylamine is allowed to stand for about 12 hours at ordinary temperature, whereby polymerization takes place with the formation of a colorless viscous mass. The resulting product is soluble in water and may be employed with advantage as an addition to spinning baths for artificial silk.

Instead of the aqueous solution of ethylene-imine, the anhydrous product may also be employed, whereby a colorless solid mass is obtained. The polymerization may be accelerated by the addition of about 1 per cent of sodium bisulphate. In some cases it may be preferable to impregnate materials, as for example cellulose, with monomeric ethylene-imines and then subsequently to carry out the polymerization.

Example 2

Ethylene imine is allowed to flow into a stirring vessel at from 50° to 100° C., small amounts of 30 per cent aqueous hydrochloric acid being gradually introduced. The ethylene imine reacts intensely with the formation of a highly viscous liquid water-soluble polymerization product.

Example 3

Monomeric phenylethylene-imine is suspended in water. The mixture is slightly warmed while stirring. A white water-insoluble powder-like product is formed. The reaction may be accelerated by passing a current of air through the liquid or leading in a very slow current of hydrogen chloride or by adding a small amount of muriatic or sulphuric acid.

Example 4

Propyl ethylene-imine is stirred and a very small amount of gaseous hydrogen chloride is led in. The temperature is raised up to 80° C. and then up to the boiling point. Fresh propyl ethylene imine is then added continuously. A highly viscous polymerization product is formed which may be employed as an addition to spinning masses in the production of artificial fibers or for the improvement of fibrous materials of all kinds.

Example 5

A mixture of from 99.9 to 99.5 per cent of cyclohexyl ethylene-imine and from 0.1 to 0.5 per cent of chlorethyl amine (or its hydrochloride) is heated to about 100° C. A wax-like mass which is insoluble in water is obtained.

Butylene imine may be employed instead of cyclohexyl ethylene imine.

Example 6

Monomeric ethylene imine (or water-soluble polymeric ethylene imine obtained by polymerization under mild condition, i. e. short time, relatively low temperature and in the absence of higher amounts of catalysts) is heated under pressure together with ethanolamine sulphuric acid ester. A tough rubber-like polymerization product is obtained which is suitable for the preparation of artificial masses. Interpolymerization products may be prepared by effecting the polymerization in the presence of other polymerizable compounds.

Example 7

Phenylethylene-imine is suspended in water and 1 per cent or still less of hydrogen peroxide is added. The mass is heated while stirring. A colorless product is obtained which is practically insoluble in organic solvents.

The polymerization may be effected in the presence of fibrous materials of any kind. The product may be employed in emulsified form for treating natural or artificial fibers; it may also be added to spinning baths in the preparation of artificial fibers.

The expression "free ethylene imines" as employed in the following claims means that the ethylene imines are not neutralized with an acid; accordingly when an acid or another acid-reacting substance is employed as a catalyst, such catalyst is employed in lower than equivalent amounts.

What we claim is:

1. The process for the production of valuable nitrogenous products which comprises polymerizing a free ethylene-imine in the presence of a small amount of an agent promoting polymerization selected from the class consisting of acid reacting substances, substances exerting an oxidising action and surface-active substances.

2. The process for the production of valuable nitrogenous products which comprises polymerizing a free ethylene-imine in the presence of a small amount of an acid reacting agent promoting polymerization.

3. The process for the production of valuable nitrogenous products which comprises polymerizing free ethylene-imine in the presence of a small amount of an acid reacting agent promoting polymerization at a temperature between ordinary temperature and about 200° C.

4. The process for the production of valuable nitrogenous products which comprises polymerizing free ethylene-imine in the presence of a small amount of an acid reacting agent promoting polymerization at a temperature between about 50° and about 120° C.

5. Viscous to waxy polymerization products of ethylene imines.

6. Water-insoluble viscous to waxy polymerization products of ethylene imines.

7. Viscous to waxy polymerization products of ethylene imines containing more than 2 carbon atoms in the molecule.

8. Viscous to waxy polymerization products of ethylene imines substituted by a radical selected from the class consisting of alkyl, cycloalkyl and aryl radicals.

HEINRICH ULRICH.
WALTER HARZ.